United States Patent
Roby et al.

(10) Patent No.: US 9,448,548 B2
(45) Date of Patent: Sep. 20, 2016

(54) SYNCHRONIZING AND DISPLAYING FAULT TOLERANT ETHERNET (FTE) STATUS

(71) Applicant: HONEYWELL INTERNATIONAL INC., Morristown, NJ (US)

(72) Inventors: Steven Roby, Glendale, AZ (US); John Michael Prall, Cave Creek, AZ (US); Laurence Clawson, Cave Creek, AZ (US); Ronald E. Rygielski, Peoria, AZ (US); Michael Novak, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 363 days.

(21) Appl. No.: 14/081,673

(22) Filed: Nov. 15, 2013

(65) Prior Publication Data
US 2014/0371881 A1 Dec. 18, 2014

Related U.S. Application Data

(60) Provisional application No. 61/835,172, filed on Jun. 14, 2013.

(51) Int. Cl.
*G05B 15/02* (2006.01)
(52) U.S. Cl.
CPC .................................. *G05B 15/02* (2013.01)
(58) Field of Classification Search
USPC ........................................................ 370/242
See application file for complete search history.

(56) References Cited

U.S. PATENT DOCUMENTS

| | | | |
|---|---|---|---|
| 4,964,120 A | 10/1990 | Mostashari | |
| 6,229,538 B1 | 5/2001 | McIntyre et al. | |
| 6,308,282 B1* | 10/2001 | Huang | H04L 69/40 370/216 |
| 6,330,690 B1* | 12/2001 | Nouri | G06F 1/20 709/223 |
| 7,305,466 B1* | 12/2007 | Kaffine | H04L 12/2602 703/21 |
| 7,397,385 B1* | 7/2008 | Bajpay | G01R 31/088 340/635 |
| 7,817,538 B2* | 10/2010 | Balasubramanian | H04L 12/2697 370/218 |
| 2003/0235216 A1 | 12/2003 | Gustin | |
| 2007/0008968 A1 | 1/2007 | Baker et al. | |
| 2008/0117068 A1* | 5/2008 | Sandstrom | H04L 41/06 340/635 |
| 2012/0051252 A1 | 3/2012 | Iwao et al. | |
| 2013/0088952 A1 | 4/2013 | Balasubramanian et al. | |
| 2014/0125802 A1* | 5/2014 | Beckert | H04N 5/213 348/148 |

OTHER PUBLICATIONS

Honeywell, Product Information Note, Sep. 2002, Honeywell, p. 1-7.*
Honeywell, Fault Tolerant Etherent Delivers Robust Networking Solution for Experion PKS, 2010, Honeywell, p. 1-6.*

* cited by examiner

*Primary Examiner* — Kidest Bahta
(74) *Attorney, Agent, or Firm* — Jetter & Associates, P.A.

(57) ABSTRACT

A method of displaying fault tolerant Ethernet (FTE) status in a process control system having FTE devices in a FTE community including a plurality of Enhanced Universal Control Networks (EUCNs) each having an Enhanced Network Interface Module (ENIM). FTE cable status data is collected from the FTE devices during system operation. Responsive to receiving user's request, generating diagnostic display view data filtered by a FTE Device index including FTE status for any combination of the FTE devices or second FTE diagnostic display view data filtered by EUCN node number including FTE status for FTE devices in a user selected EUCN. The first FTE diagnostic display view data or second FTE diagnostic display view data are transmitted to a device of the user, and is then displayed on a user's display.

14 Claims, 7 Drawing Sheets

FTE STATUS: View from EUCN 10

[SPECIFY EUCN] [PERF MENU] [HELP]

FTE STATUS - FILTERED BY FTE DEVICE INDEX

GO TO: FTE STS DISPLAY FILTERED BY UCN NODE#

| NODE NAME | ENIM #038 |
|---|---|
| FTE DEVICE INDEX | 38 |
| IP ADDRESS | 10.10.0.38 |
| SUBNET MASK | 255.255.248.0 |
| FTE MULTCST ADDR | 224.0.0.105 |
| LAN REDUNCY PORT | 3622 |
| UCN NODE ADDRESS | 2 |
| BOOT FW VERSION | EPNI2_1.31 |
| APPL FW VERSION | N/A |
| AUTH GROUP | 37 |
| AUTH STATE | OPERATE |
| AUTH SERVER IP | 10.10.0.37 |
| TIME SYNC STATUS | IN SYNC |
| TIME SERVER IP | 10.10.4.20 |
| TIME VARIANCE (MS) | 0.359571 |
| TIME SOURCE | PTP |

[CLOSE]

| DEVIDX | FTE STS A A | FTE STS B B | DUPL |
|---|---|---|---|
| 33 | 0 0 | 0 0 | - |
| 34 | 0 0 | 0 0 | - |
| 35 | 0 | 0 | - |
| 36 | | | |
| 37 | 0 0 | 0 0 | - |
| 38 | 0 0 | 0 0 | - |
| 39 | | | |
| 40 | | | |
| 41 | | | |
| 42 | | | |
| 43 | | | |
| 44 | | | |
| 45 | | | |
| 46 | | | |
| 47 | 0 0 | 0 0 | - |
| 48 | | | |

| DEVIDX | FTE STS A A | FTE STS B B | DUPL |
|---|---|---|---|
| 49 | 0 0 | 0 0 | - |
| 50 | | | |
| 51 | 0 0 | 0 0 | - |
| 52 | | | |
| 53 | 0 0 | 0 0 | - |
| 54 | 0 0 | 0 0 | - |
| 55 | 0 0 | 0 0 | - |
| 56 | 0 0 | 0 0 | - |
| 57 | 0 | 0 | - |
| 58 | | | |
| 59 | | | |
| 60 | | | |
| 61 | | | |
| 62 | | | |
| 63 | | | |
| 64 | | | |

| Composite Status: | A→B OK | A→B OK | B→A OK | B→B OK | Dup State No Duplicates |
|---|---|---|---|---|---|

[RESET STATS] [PAGE BACK] [PAGE FWD] PAGE: 1/8

*FIG. 3*

| Sample FTE Status Array Bit Value Obtained from FTE Driver | Description/Interpretation | Status Displayed to User on FTE Status Schematic |
|---|---|---|
| (1,1,0,0,1,1,1,1) | All Cables Good and No Duplicates | O O O O - |
| (1, 1,0,1,1,1,1,1) | All Cables Good, but Duplicate PD Tag (Computer Name) | O O O O P |
| (1,1,1,0,1,1,1,1) | All Cables Good, but Duplicate Device Index | O O O O D |
| (1,1,1,1,1,1,1,1) | All Cables Good, but both Device Index and PD Tag Duplicate | O O O O B |
| (1,1,0,0,0,0,1,1) | "A" Cable Bad and No Duplicates | X X O O - |
| (1,1,1,0,0,0,1,1) | "A" Cable Bad, but Duplicate Device Index | X X O O D |
| (1,1,0,0,1,1,0,0) | "B" Cable Bad and No Duplicates | O O X X - |
| (1,1,0,1,1,1,0,0) | "B" Cable Bad, but Duplicate PD Tag (Computer Name) | O O X X P |
| (1,1,0,0,1,0,0,1) | Crossover (a.k.a. "X") Cable Bad and No Duplicates | O X X O - |
| (1,1,1,1,1,0,0,1) | Crossover (a.k.a. "X") Cable Bad, but both Device Index and PD Tag Duplicate | O X X O B |

*FIG. 4A*

Legend:

| Single Text Character | Interpretation | Single Text Character | Interpretation |
|---|---|---|---|
| O | Receiving Device's Network Port is receiving communication from sending device's Network Port | - | No Duplicate PD Tag (a.k.a. Computer Name) or Device or Device Index |
| X | Receiving Device's Network Port is NOT receiving communication from sending device's Network Port | P | Duplicate PD Tag (Computer Name) |
| | | D | Duplicate FTE Device Index |
| | | B | Both Device Index and PD Tag Duplicate |

*FIG. 4B*

| UCN NODE | FTE STATUS A A B B Dup A B A B State | UCN NODE | FTE STATUS A A B B Dup A B A B State | UCN NODE | FTE STATUS A A B B Dup A B A B State | UCN NODE | FTE STATUS A A B B Dup A B A B State |
|---|---|---|---|---|---|---|---|
| 01 | O O O O - | 17 |  | 33 |  | 49 |  |
| 02 | O O O O - | 18 |  | 34 |  | 50 |  |
| 03 |  | 19 | O X X O - | 35 |  | 51 |  |
| 04 |  | 20 | O X X O - | 36 |  | 52 |  |
| ••• |  | ••• |  | ••• |  | ••• |  |
| 15 | X X O O - | 31 |  | 47 | O O O O - | 63 | O O X X - |
| 16 | X X O O - | 32 |  | 48 |  | 64 | O O X X - |

*FIG. 5A*

| FTE Device Index | FTE STATUS A A B B Dup A B A B State | FTE Device Index | FTE STATUS A A B B Dup A B A B State | FTE Device Index | FTE STATUS A A B B Dup A B A B State | FTE Device Index | FTE STATUS A A B B Dup A B A B State |
|---|---|---|---|---|---|---|---|
| 01 | O O O O - | 17 |  | 33 |  | 49 |  |
| 02 | O O O O - | 18 |  | 34 |  | 50 |  |
| 03 |  | 19 | O X X O - | 35 |  | 51 |  |
| 04 |  | 20 | O X X O - | 36 |  | 52 |  |
| ••• |  | ••• |  | ••• |  | ••• |  |
| 15 | X X O O - | 31 |  | 47 | O O O O - | 63 | O O X X - |
| 16 | X X O O - | 32 |  | 48 |  | 64 | O O X X - |

PAGE 1/8
PREV NEXT

*FIG. 5B*

| FTE Device Index | FTE STATUS A A B B Dup A B A B State | FTE Device Index | FTE STATUS A A B B Dup A B A B State | FTE Device Index | FTE STATUS A A B B Dup A B A B State | FTE Device Index | FTE STATUS A A B B Dup A B A B State |
|---|---|---|---|---|---|---|---|
| 65 | O O O O - | 81 |  | 97 |  | 113 |  |
| 66 | O O O O - | 82 |  | 98 |  | 114 |  |
| 67 |  | 83 | O O O O - | 99 |  | 115 |  |
| 68 |  | 84 | O O O O - | 100 |  | 116 |  |
| ••• |  | ••• |  | ••• |  | ••• |  |
| 79 | O O O O - | 95 |  | 111 | O O O O - | 127 | O O O O - |
| 80 | O O O O - | 96 |  | 112 |  | 128 | O O O O - |

PAGE 2/8
PREV NEXT

*FIG. 5C*

UCN NODE FTE STATUS

| NODE NAME | EHPM #023 |
|---|---|
| FTE DEVICE INDEX | 23 |
| IP ADDRESS | 10.10.0.23 |
| SUBNET MASK | 255.255.248.0 |
| FTE MULTICAST ADDR | 224.0.0.105 |
| LAN REDUNDANCY PORT | 3622 |
| UCN NODE ADDRESS | 31 |
| BOOT FW VERSION | EHPM_1.32 |
| APPLICATION FW VERSION | N/A |
| AUTHENTICATION GROUP | 17 |
| AUTHENTICATION STATE | OPERATE |
| AUTH SERVER IP | 10.10.0.17 |
| TIME SYNC STATUS | IN SYNC |
| TIME SERVER IP ADDRESS | 10.10.4.20 |
| TIME VARIANCE (MS) | 0.0123 |
| TIME SOURCE | PTP |

SYNCHRONIZING AND DISPLAYING FAULT TOLERANT ETHERNET (FTE) STATUS

CROSS REFERENCE TO RELATED APPLICATIONS

This application claims the benefit of Provisional Application Ser. No. 61/835,172 entitled "SYNCHRONIZING AND DISPLAYING FAULT TOLERANT ETHERNET (FTE) STATUS", filed Jun. 14, 2013, which is herein incorporated by reference in its entirety.

FIELD

Disclosed embodiments relate to process control systems including control networks having redundant cables over which control network nodes communicate, including displaying a detected fault in a cable from which any of the nodes is receiving signals.

BACKGROUND

When a process control system is configured as a local area network (LAN) to control an industrial process, the reliability of the LAN is generally a high priority requirement. Reliability of a LAN can be significantly increased by redundancy of the modules, or nodes, of the LAN and the media over which the nodes communicate, such as over a coaxial cable or Ethernet cable.

SUMMARY

Disclosed embodiments include methods of displaying fault tolerant Ethernet (FTE) status in a process control system having FTE devices in a FTE community including a plurality of Enhanced Universal Control Networks (EUCNs) each having a Enhanced Network Interface Module (ENIM).

As used herein, "enhanced" as in EUCNs, Enhanced High Performance Process Managers (EHPMs) and ENIMs refers to such devices having Ethernet connectivity, expanded process controller interoperability, and better diagnosability compared to their token bus controller-based network with coaxial cable media counterparts. The enhancement is enabled by placing these devices/nodes on the Ethernet, giving users enhanced and simpler ways to diagnose Ethernet cable problems, and providing greater interoperability with other controllers (e.g., Honeywell International's Experion C300's). A non-enhanced UCN having conventional non-enhanced NIMs and conventional non-enhanced Process Managers cannot do these things as they are part of a token bused controller-based network using coaxial cable media.

Also, as used herein, an "FTE device" is a device which can transmit and receive FTE cable status data, generally being a device that is compliant with the International Electrotechnical Commission (IEC) 62439 clause 4 (Edition 1.0 2010-02) specifications.

FTE cable status data for the FTE devices in the FTE community is obtained from at least one of the ENIMs which collects FTE cable status data for the FTE devices in the FTE community during system operation. At least two different user selectable FTE status display views each displayable upon a user's selection are provided, including a first FTE diagnostic display view and a second FTE diagnostic view. The first FTE diagnostic display view includes an FTE status for respective FTE devices in a user' selected one of the EUCNs. The second FTE diagnostic display view includes the FTE status for any combination of FTE devices in the FTE Community based on a user selected FTE device index.

BRIEF DESCRIPTION OF THE DRAWINGS

FIG. 3 is a scanned screenshot of an example second FTE diagnostic display view filtered by EUCN node number including the FTE status for respective FTE devices in a user selected one of the EUCNs.

FIG. 4A shows some example FTE status array bit values for an 8-bit Byte, their description/interpretation, and the status view displayed to a user, while FIG. 4B shows interpretations for the various single text characters in the status view displayed to the user shown in FIG. 4A.

FIG. 5A shows an example FTE Status Array display filtered by UCN node number, while FIG. 5B shows an example FTE Status Array display filtered by FTE device index with FTE Devices 01 to 64 being shown. Selecting "next" advances the FTE Device index to the next page worth of values shown in FIG. 5C with the FTE status of FTE Devices 65 to 128 being shown.

DETAILED DESCRIPTION

Figure 1A:
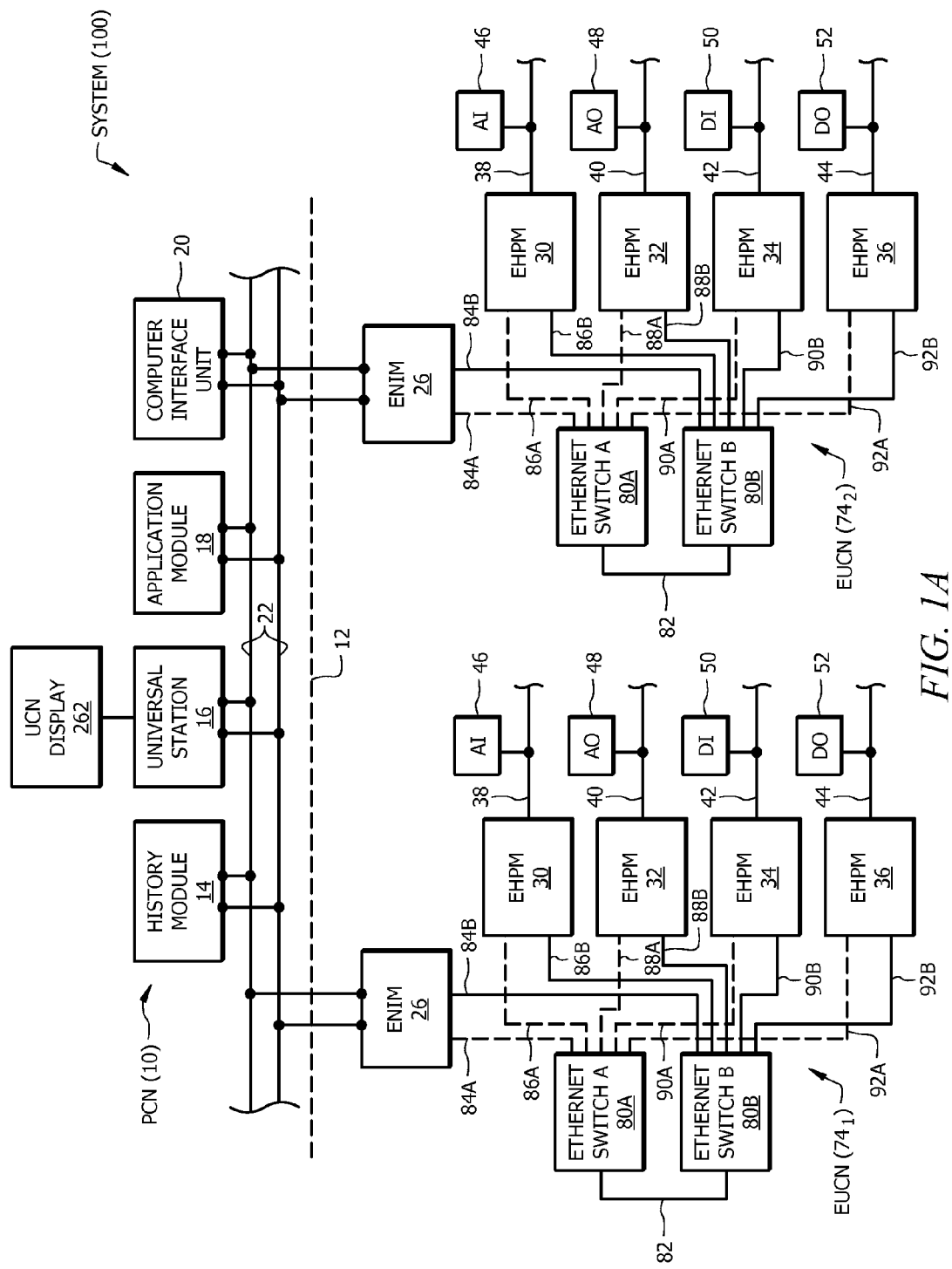
FIG. 1A is a schematic block diagram of process control system having a plurality of EUCNs controlled by a plant control network (PCN) which is a token passing LAN.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Referring to FIG. 1A, a process control system 100 is shown including a plant control network (PCN) 10 having the components which lie above dashed line 12 being a token passing LAN, which controls a plurality of EUCNs with EUCN 74$_1$ and EUCN 74$_2$ being shown (collectively or individually referred to herein as EUCN 74). Modules 14, 16, 18, and 20 of PCN 10 have various specialized functions and each is connected to a communication medium, dual redundant cables, of plant control bus 22 over which the modules shown as 14 (history module), 16 (universal station), 18 (application module), and 20 (computer interface unit) communicate. The universal station 16 is shown having a UCN status display 262. The UCN Status display displays updated FTE cable status received as UCN cable status, such as by manipulating "A" and/or "B" text characters by backlighting their color. PCN 10 generally communicates with a large number of distributed digital process control and data acquisition subsystems, with only two such EUCNs, EUCN 74$_1$ and EUCN 74$_2$ illustrated in FIG. 1A for simplicity.

EUCN 74 is particular FTE network, both originally created by Honeywell International designed to provide rapid network redundancy. A EUCN is functionally equivalent to the universal control network shown as UCN 24 in FIG. 1 of U.S. Pat. No. 4,964,120 to Mostashari. A EUCN implements an emulated token bus over Ethernet.

Each of the EUCNs 74$_1$ and 74$_2$ include a plurality of Enhanced High Performance Process Managers (EHPM's) shown as EHPM 30, 32, 34 and 36 and an Enhanced Network Interface Module (ENIM) 26. Each EUCN device is connected to a pair of Ethernet switches (Ethernet switch A 80A, and Ethernet switch B 80B) using standard Ethernet cables (84A,84B,86A,86B,88A,88B,90A,90B,92A,92B, 94A,94B). A cross-connect cable 82 links Ethernet Switch 80A to Ethernet Switch 80B.

Each EUCN 74$_1$ and 74$_2$ is an Ethernet-based PCN LAN. The EUCN 74$_1$ and 74$_2$ communicate with the PCN 10 through its own ENIM 26 which provides communications and data translation facilities between plant control bus 22 and the Ethernet cables (84A,84B,86A,86B,88A,88B,90A, 90B,92A,92B,94A,94B) of the EUCNs 74. EHPM's 30, 32, 34, 36 control devices in the plant such as valves, switches, etc. I/O modules AI 46, AO 48, DI 50, and DO 52 provide an interface to field devices (not shown), such as valves, pressure switches, pressure gauges, thermocouples in the plant. AI module 46 converts analog signals from a source of analog signals, to signals acceptable to EHPM 30 and is designated AI for analog input. AO module 48 converts digital output signals of EHPM 32 to analog signals and is designated AO. DI module 50 converts digital input signals applied to signals acceptable to EHPM 34. DO module 52 converts output signals of EHPM 36 to digital signals for a control device. The I/O modules are connected to respective EUCN devices (30, 32, 34 and 36) by Ethernet cables 38, 40, 42 and 44.

Figure 1B:
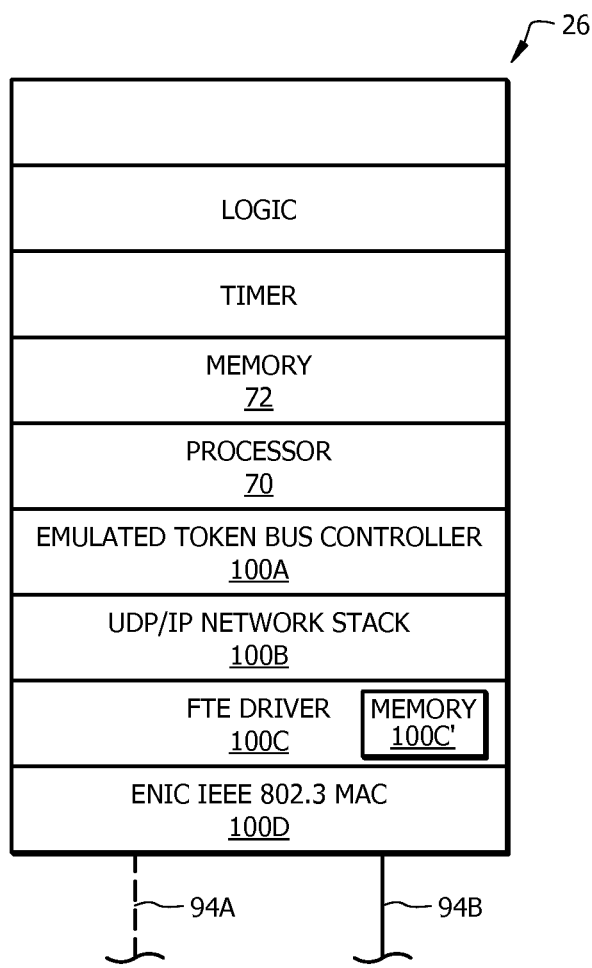
FIG. 1B is a schematic block diagram of an ENIM within one of the EUCNs of FIG. 1A, identifying the elements/subsystems which are common to each module of the EUCNs.

The ENIM 26 and EHPM 30, 32, 34, and 36 in each EUCN 74 generally have the same comment elements or subsystems. In FIG. 1B the common elements of ENIM 26 are shown, which could also represent the elements of EHPM 30, 32, 34 or 36. ENIM 26 includes a processor 70 and memory 72 which can be from commercially available devices.

ENIM 26 also includes an Emulated Token Bus Controller software 100A and a redundant pair of Ethernet Network Interface Controllers (ENIC), transceivers and associated components implementing the media access control (MAC) portion of the IEEE 802.3 (Ethernet) interface shown as IEEE 802.3 MAC 100D. The FTE Driver 100C provides transparent network redundancy to the User Datagram Packet (UDP)/Internet Protocol (IP) Network Stack 100B used to encapsulate UCN messages in User Datagram Packet (UDP) packets. The FTE Driver 100C includes an associated memory 100C'. All EUCN devices (ENIM 26, EHPMs 30, 32, 34, 36) can implement the Honeywell FTE driver 100C (or other FTE driver) and be members of the same FTE Community. A FTE community includes devices that are configured to join the same IP Multicast group, each with a unique FTE device index. More complex variations on the FTE network topology are possible. This simplest of topologies is shown in FIG. 1A for illustrative purposes.

With the development of the EUCN 74 having an Ethernet FTE as opposed to the earlier UCN having coaxial cable disclosed in U.S. Pat. No. 4,964,120 to Mostashari, disclosed embodiments recognize there is an advantage being able to view the FTE Status on a legacy control system and have the FTE status be synchronized with the rest of the FTE network. Customers/Users who only have the legacy control system as their view to the process can benefit from viewing the FTE status to diagnose and troubleshoot FTE network problems, while also being able to view details associated with each device in the FTE Network.

Disclosed embodiments further recognize since in one particular arrangement EUCN 74 can fall within a legacy restriction of a maximum of UCN devices of 64 from being a token bus-based system but PCN 10 support more devices by supporting a maximum of 511 FTE devices per FTE community, there is a need for two ways of viewing/filtering the FTE status display, specifically filtering by UCN node/device number and filtering by FTE device index. The legacy control system user/customer can benefit from a way to be able to see the FTE Status for their EUCN devices, as well as the other FTE devices which may be in their entire FTE Community. Disclosed embodiments provide a solution to this need.

Diagnostic/troubleshooting displays for EUCNs are disclosed that utilize new internal control network parameters which have their FTE status data populated by FTE status data from the Ethernet stack and FTE driver 100C at the EUCN Ethernet devices (e.g. ENIM 26 and/or EHPM(s) 30, 32, 34 and 36 shown in FIG. 1A), through varying tasks and databases coming from (driven by) a computing device or processor generally on a circuit board at the ENIM 26 or EHPM(s) 30, 32, 34 and 36 in the EUCN 74.

Disclosed displays can use a character-based approach to show the FTE Status of the 4 possible cable paths for the 2 Ethernet cables of A→A, A→B, B→A and B→B, where the paths involving Cable A and Cable B are paths across an Ethernet switch (see 80A or 80B in FIG. 1A), as well as indicated of the duplicate status (No duplicates, Duplicate PdTag, Duplicate Device Index, or Both Duplicate PdTag and Device Index). For example, a good FTE Status for Ethernet cable paths at a given device in a EUCN 74 can be shown as "O O O O-", with the letter O (as in Oscar) being an abbreviation for "OK" and the dash ("-") signifying "No Duplicates". A bad status (for example, a bad "A" Ethernet cable path) can be represented as "X X O O-" signifying both the Ethernet paths A→A and A→B are bad for this device, with the letter X (as in X-Ray) being a visible indication for an Ethernet cable being bad. There can also be a color coding of the status, for example with green color being used for everything (for the whole status line) being good and red color being used (for the whole status line) if anything about the Ethernet cable status is bad.

One disclosed feature comprises providing two different available FTE status display views which are each filtered by a different set of the FTE devices. One display view (referred to herein as a second FTE diagnostic display view) can be filtered by the FTE devices on the specific EUCN 74 that a user selects to view (e.g., UCN devices 01-64, per a selected EUCN 74, such as EUCN 74₁), while the other display view (referred to herein as a first FTE diagnostic display view) can be filtered/sorted by a user selected FTE Device Index which can be used to show the FTE status of any combination (including all) of the possible FTE devices in the FTE Community (comprising a plurality of EUCNs), for example 511.

Another disclosed feature comprises the ability to select a specific device (whether by EUCN device number while viewing the second FTE diagnostic display view or FTE device index while viewing the first FTE diagnostic display view) and reveal a sub-display to provide auxiliary details about the FTE device (see FIG. 6, described below). This detailed data can also be populated as new control network parameters from a database accessible by the processor 70 of the ENIM 26.

Yet another disclosed feature can comprise compiling a view of the composite status of the entire FTE Community on the bottom (or other position, such as the top or one of the sides) of the display(s). This composite view can show the overall status of all 511 FTE-devices, and whether any of the devices has a bad Ethernet cable status.

Figure 2:
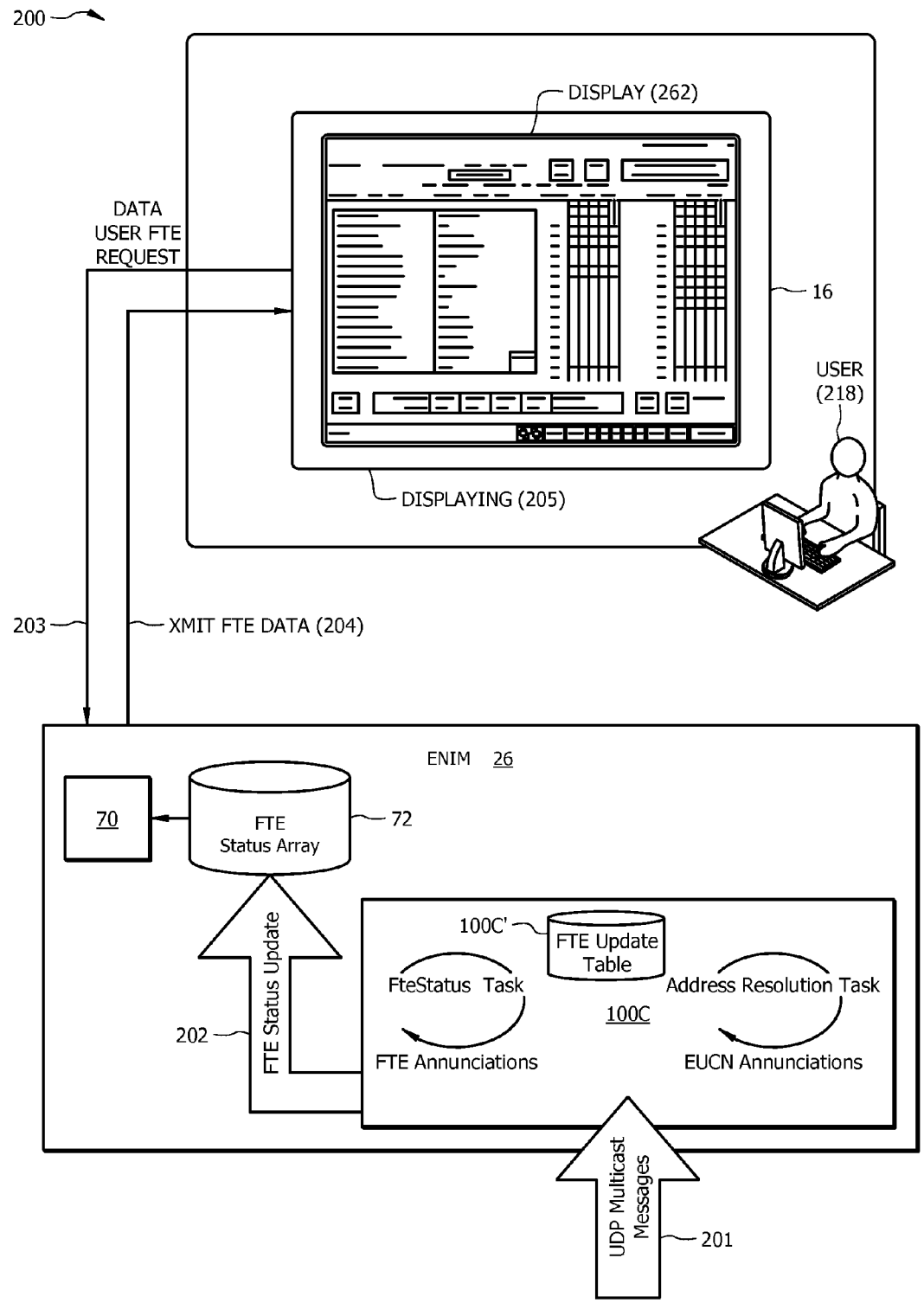
FIG. 2 is a hardware enhanced flowchart/flow diagram of an example method of synchronizing and displaying FTE status for a process control system including FTE devices in a FTE community having a plurality of EUCNs, according to an example embodiment.

FIG. 2 is a hardware enhanced flowchart/flow diagram of an example method 200 for synchronizing and displaying the FTE status for control network devices (referred to as FTE devices) in a process control system including a FTE community having a plurality of EUCNs 74, according to an example embodiment. Each FTE device in the FTE community maintains at least its own FTE status. A system user 218 is shown at the universal station 16 of a PCN (such as PCN 10 shown in FIG. 1A) having a UCN display device 262.

In step 201, FTE cable status data is collected from the respective FTE devices (including, but not limited to EHPMs, and ENIMs) in the FTE community during operation of the process control system. FTE status may be provided by I/O devices (e.g., AI 46, AO 48, DI 50, and DO 52 in FIG. 1A) when specially equipped for Ethernet communications. User Datagram Protocol (UDP) multicast messages may be transmitted by the respective FTE devices to provide FTE cable status data to an associated memory 100C' of the FTE driver 100C of the ENIMs 26 and/or EHPMs 30, 32, 34, 36 in the respective EUCNs, shown in FIG. 2 as ENIM 26. FTE annunciations and EUCN annunciations are generally transmitted at different times. The UDP multicast messages generally come from the network layer from the FTE devices. The FTE cable status data remains local within the devices in the EUCNs after step 201. The FTE driver 100C in the ENIM 26 and EHPMs 30, 32, 34, 36 of each EUCN 74 can create a local view of the FTE network status from the collected FTE status information.

The FTE annunciations include FTE diagnostic messages which contain status arrays representing each particular device's view of the Ethernet paths to other FTE devices being either good or bad. In addition to the FTE Status, the duplicate state of each device can be maintained. The EUCN annunciations describe the emulated EUCN node status of the device. The annunciation gives more detailed characteristics of the device including address information (e.g., the message can include the EUCN node number, IP address, subnet mask, authentication group, etc.)

Step 202 comprises the FTE driver 100C of the ENIMs 26 and/or EHPMs 30, 32, 34, 36 transmitting the FTE (network) status update information to update the FTE status array (database) in the memory 72 of at least one of the ENIMs 26. The FTE cable status data received at the ENIM 26 is for all of the FTE devices in the entire FTE community. The receiving ENIM(s) in practice is generally where the user chooses to monitor/view the device status from. As noted above, there can be multiple ENIMs per FTE community, with all ENIMs receiving the FTE status update information. This update can occur periodically, such as once per second in one particular example.

Step 203 comprises receiving a user' request for first FTE diagnostic display view data filtered by a FTE Device index including the FTE status for any combination of FTE devices in the FTE Community or at least second FTE diagnostic display view data filtered by EUCN node number including FTE status for respective FTE devices in a user selected one of the EUCNs. The user 218 thus has the option to select from the FTE diagnostic display view data (filtered by FTE Device index) and the second FTE diagnostic display view data (filtered by EUCN node number).

For example, to support the first FTE diagnostic display view, the memory 72 of an ENIM 26 can store the FTE status array as shown in FIG. 2 which can be maintained in a database indexed by the 511 possible FTE device indexes on the FTE community plus a 512th row containing a composite status of all device' statuses. In one particular arrangement, the FTE status array database can be organized as an array of 512 bytes, each byte having 8 bits containing information about hearing receive messages, number of interfaces, duplicate state of the device, and the status of the four redundancy Ethernet paths. See Table 1 below labeled FTE status array definition. To support the second FTE diagnostic display view where the FTE status includes only the local UCN's devices indexed by UCN device number, the memory 72 of an ENIM 74 can store a database having an array of 65 status bytes (a byte for each of the 64 UCN devices plus a byte for a local UCN composite status).

TABLE 1

FTE Status Array Definition

| Bit Offset | Description | |
|---|---|---|
| 7 | Heard - set if any receive is heard, reset when commanded | |
| 6 | Num Interfaces - 0 = single NIC, 1 = FTE (expect all devices to be 1) | |
| 4-5 | 0 = No Duplicates: | Bit Pattern (00) |
|  | 1 = Duplicate PD Tag: | Bit Pattern (01) |
|  | 2 = Duplicate Device Index: | Bit Pattern (10) |
|  | 3 = Both Device Index and PD Tag duplicate: | Bit Pattern (11) |
| 3 | A => A status 0 = Silent, 1 = Heard | |
| 2 | B => A status 0 = Silent, 1 = Heard | |
| 1 | A => B status 0 = Silent, 1 = Heard | |
| 0 | B => B status 0 = Silent, 1 = Heard | |

The interpretation of the FTE cable status data request from the user 218 in step 203 can in one particular example be in the form of an 8 bit paged status command parameter value, such as follows:
   0=Read link layer control (LLC) Statistics
   1=Read then Clear LLC Statistics
   2=Read FTE status indexed by FTE device index as well indexed by UCN address (at end of buffer)

3=Read FTE status indexed by FTE device index then clear the Device heard bit on disjoined nodes
4=Read FTE Detail1 ($FTEDTL1) indexed by Device index
5=Read FTE Detail1 ($FTEDTL1) indexed by UCN Device
6=Read FTE Detail2 ($FTEDTL2) indexed by Device index
7=Read FTE Detail2 ($FTEDTL2) indexed by UCN Device This status can be polled by the ENIM software ("personality") similar to the LLC Statistics poll. The data can be placed in an ENIM parameter(s) (control network Data Accessible-Named Parameters) which are requested and used by FTE status displays.

Step 204 comprises transmitting the requested FTE data for the user selected FTE diagnostic display view to a device associated with the user 218. A detail display line can provide individual selectable detailed FTE device information identified by Device Index (the first FTE diagnostic display view), or UCN device number (the second FTE diagnostic display view). The transmitted information to the user 218 can also include auxiliary status data including PD Tag (device name), FTE Device Index ((e.g., 1 to 511), UCN IP Address, and Subnet Mask.

The layout of an example FTE Detailed Status is shown in Table 2 below.

TABLE 2

FTE Device Auxiliary Status (a.k.a. FTE Detailed Status)

| Field Name | Size | Field Data |
|---|---|---|
| Request #1 Data filtered by FTE Device Index ||| 
| PDTag - Device Name | 15 | EHPM #XXX, ENIM #XXX, C300 #XXX, etc . . . |
| FTE Device Index | 3 | 1-511 |
| IP Address | 15 | 10.1.0.0+[FTE device Index] or bootp provided base IP Address |
| Subnet Mask | 15 | 255.255.0.0 or bootp provided subnet mask |
| FTE IPMC Group Address | 15 | 234.5.6.7 or bootp provided group address |
| LAN Redundancy Port | 5 | 51966 (or bootp provided address) |
| Spare_1 | 60 | padding for first 128 bit read |
| Request #2 Data filtered by EUCN Device Address |||
| UCN Device Address | 3 | 1-64, 64-128 indicated with preceding hyphen (e.g. '14) |
| UCN Authentication Group | 3 | 1-511 |
| BOOT FW Revision | 16 | EPNI2_100.1 (part 1 and board resident as built in factory) or Experion release string (part 2) |
| APP FW Revision | 16 | N/A (part 1) or Experion release string (part 2) |
| Authentication State | 8 | NONE, INIT, REQ FAIL, REQ PASS, FAIL KEY, RESPSENT, RESPFAIL, RESPPASS, PENDING, OPERATE, SERVER, MASTER |
| Authentication Server | 15 | IP Address of authentication server - authenticating primary ENIM |
| TimeSync Status | 8 | NONE, LISTEN, IN SYNC, FAILURE |
| TimeSync Server | 15 | IP Address of Time Sync Server |
| PTP Variance | 8 | N/A or Variance in milliseconds if PTP source |
| Time Source | 4 | PTP, SNTP, LCN, CDA, NONE |
| Spare_2 | 32 | padding for second 128 bit read |

Step 205 comprises displaying the selected FTE diagnostic display view (first FTE diagnostic view or second FTE diagnostic view) on a display 262 of the user 218, such as at the universal station 16 shown. Regarding the first FTE diagnostic view, the control network status display when filtered by FTE device index can be paged to allow a user 218 to view all FTE device statuses (e.g., all 511 devices). On each page a composite status indicates the overall FTE health. This first FTE diagnostic display view can be displayed in a columnar form, a table of FTE device status and duplicate state organized by device index. All device indexes can be displayed with characters identifying silent and okay state of each redundancy path. The second FTE diagnostic display view showing only the local UCN devices, can be indexed by the UCN device number.

FIG. 3 is a scanned screenshot of an example second FTE diagnostic display view filtered by EUCN node number including the FTE status for respective FTE devices in a user selected one of the EUCNs for the particular case where there are 64 nodes in each EUCN, with the nodes of one particular EUCN, EUCN 10 (the tenth EUCN) being shown in FIG. 3. The FTE diagnostic display view shown includes auxiliary status data. The option for the user to select "FTE Status-Filtered by FTE Device index" is shown. A composite status view of all of FTE devices in the FTE Community is also shown on the bottom of the display view, where although the FTE status is shown good for all FTE devices, the composite status view can highlight of any of FTE device for which the FTE status is determined to be bad.

FIGS. 4A to 6 provide a text-based description of examples of disclosed FTE status displays. FIG. 4A shows some example FTE Status Array Bit Values for an 8-bit Byte (generally obtained from memory 100C' of FTE driver 100C), their description/interpretation, and the Status displayed to a user, while FIG. 4B the interpretations for the various single text characters in the Status displayed to the user shown in FIG. 4A.

FIG. 5A shows some an example FTE Status Array display filtered by UCN node number (01 to 64), while FIG. 5B an example FTE Status Array display filtered by FTE device index with FTE Devices 01 to 64 being shown. Selecting next advances the FTE Device index to the next page worth of values shown in FIG. 5C with the FTE status of FTE Devices 65 to 128 being shown.

Figure 6:
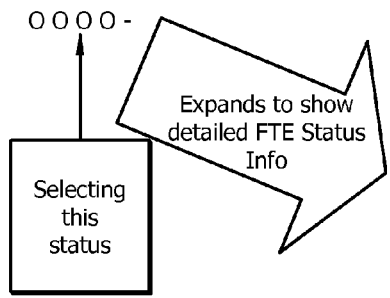
FIG. 6 shows an example implementation of a Detailed FTE Status information which can be displayed by a user selecting a device from a FTE Device Index filtered by FTE device index or a UCN node number from a display filtered by UCN node number, where the selection of the FTE status for a FTE Device/UCN node is shown in an expanded view to show exampled detailed FTE status information.

FIG. 6 shows an example implementation of a Detailed FTE Status information which can be displayed by a user selecting a device from a FTE Device Index filtered by FTE device index or a UCN node number from a display filtered by UCN node number, where the selection of the FTE status for FTE Device/UCN node 23 is shown expanding to show exampled detailed FTE status information.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As can be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The invention claimed is:

1. A method of displaying fault tolerant Ethernet (FTE) status in a process control system having FTE devices in a FTE community including a plurality of Enhanced Universal Control Networks (EUCNs) each having an Enhanced Network Interface Module (ENIM), comprising:
    collecting FTE cable status data from said FTE devices at EUCN nodes in said FTE community during operation of said process control system, wherein said FTE community is in a FTE network that is linked by FTE cables;
    responsive to receiving a user's first request for a first FTE diagnostic display view filtered by an index of said FTE Devices (FTE device index), generating first FTE diagnostic display view data filtered by said FTE Device index including said FTE status for any combination of said FTE devices in said FTE Community and responsive to receiving a user's second request for a second FTE diagnostic display view filtered by a number of said EUCN nodes (EUCN node number) generating second FTE diagnostic display view data filtered by said EUCN node number including said FTE status for respective ones of said FTE devices in a user selected one of the EUCNs;
    responsive to receiving said user's second request, transmitting said second FTE diagnostic display view data to a device of said user,
    displaying said second FTE diagnostic display view on a user's display, and
    using information associated with said second FTE diagnostic display view, automatically sending a command to said ENIM to remove one or more disjoined instances of said EUCN nodes to update said second FTE diagnostic display view.

2. The method of claim 1, wherein said ENIM in one of said plurality of EUCNs collects said FTE cable status data, and wherein said first FTE diagnostic display view data and said second FTE diagnostic display view data are provided by said ENIM responsive to said user's first request and said user's second request, respectively.

3. The method of claim 1, wherein said first FTE diagnostic display view data and said second FTE diagnostic display view further includes FTE device auxiliary status data.

4. The method of claim 1, further comprising said user selecting a specific FTE device from said FTE devices by said EUCN node number, and wherein responsive to said selecting a sub-display view is displayed which provides FTE details and a plurality of non-FTE status details including configuration information about said specific FTE device.

5. The method of claim 1, further comprising providing a composite status view of all of said FTE devices in said FTE Community including a highlighting of any of said FTE devices in which said FTE status is bad.

6. The method of claim 1, wherein said collecting FTE cable status data comprises multicast messaging by said FTE devices including separate FTE annunciations and EUCN annunciations.

7. A computer program product, comprising:
    a non-transitory data storage medium that includes program instructions executable by a processor to enable said processor to execute a method of displaying fault tolerant Ethernet (FTE) status in a process control system having FTE devices in a FTE community including a plurality of Enhanced Universal Control Networks (EUCNs) each having an Enhanced Network Interface Module (ENIM), said method including:
        collecting FTE cable status data from said FTE devices at EUCN nodes in said FTE community during operation of said process control system wherein said FTE community is in a FTE network that is linked by FTE cables;
    responsive to receiving a user's first request for a first FTE diagnostic display view filtered by an index of said FTE Devices (FTE device index), generating first FTE diagnostic display view data filtered by said FTE Device index including said FTE status for any combination of said FTE devices in said FTE Community and responsive to receiving a user's second request for a second FTE diagnostic display view filtered by a number of said EUCN nodes (EUCN node number) generating second FTE diagnostic display view data filtered by said EUCN node number including said FTE status for respective ones of said FTE devices in a user selected one of the EUCNs;
    responsive to receiving said user's second request, transmitting said second FTE diagnostic display view data to a device of said user,
    displaying said second FTE diagnostic display view on a user's display, and
    using information associated with said second FTE diagnostic display view, automatically sending a command to said ENIM to remove one or more disjoined instances of said EUCN nodes to update said second FTE diagnostic display view.

8. The computer program product of claim 7, wherein said ENIM in one of said plurality of EUCNs collects said FTE cable status data, and wherein said first FTE diagnostic display view data and said second FTE diagnostic display view data are provided by said ENIM responsive to said user's first request and said user's second request, respectively.

9. The computer program product of claim 7, wherein said first FTE diagnostic display view data and said second FTE diagnostic display view data further includes FTE device auxiliary status data.

10. The computer program product of claim 7, further comprising responsive to said user selecting a specific FTE device from said FTE devices by said EUCN node number, responsive to said selecting displaying a sub-display view which provides FTE details and a plurality of non-FTE status details including configuration information about said specific FTE device.

11. The computer program product of claim 7, further comprising providing a composite status view of all of said FTE devices in said FTE Community including a highlighting of any of said FTE devices in which said FTE status is bad.

12. The computer program product of claim 7, wherein said collecting FTE cable status data comprises multicast messaging by said FTE devices including separate FTE annunciations and EUCN annunciations.

13. The method of claim 1, further comprising troubleshooting at least one problem with cable paths associated with said FTE cables using data shown in at least said second FTE diagnostic display view.

14. The computer program product of claim 7, wherein responsive to said user selecting a specific FTE device from said FTE devices by said EUCN node number, displaying a sub-display view for aiding said user troubleshooting at least one problem with cable paths associated with said FTE cables by providing FTE details and a plurality of non-FTE status details including configuration information about said specific FTE device.

* * * * *